United States Patent
Hsu et al.

(10) Patent No.: US 7,825,362 B2
(45) Date of Patent: Nov. 2, 2010

(54) PROJECTION DEVICE HAVING A LENS ADJUSTING UNIT ADJUSTING A FOCUS OF AN ADJUSTABLE COLLIMATOR ACCORDING TO THE DISTANCE BETWEEN A LIGHT SOURCE AND THE ADJUSTABLE COLLIMATOR

(75) Inventors: Chien-Wen Hsu, Taipei Hsien (TW); Chia-Hung Kao, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 424 days.

(21) Appl. No.: 12/109,668

(22) Filed: Apr. 25, 2008

(65) Prior Publication Data

US 2009/0046257 A1  Feb. 19, 2009

(30) Foreign Application Priority Data

Aug. 16, 2007  (CN) .......................... 2007 1 0201375

(51) Int. Cl.
*H01L 27/00* (2006.01)
(52) U.S. Cl. .................................. 250/208.1; 250/216
(58) Field of Classification Search ............. 250/208.1, 250/216, 214 R; 353/76, 87, 101
See application file for complete search history.

(56) References Cited

U.S. PATENT DOCUMENTS

| 5,140,608 | A | * | 8/1992 | Karpol et al. ............... 372/101 |
| 6,309,073 | B1 | | 10/2001 | Nakayama et al. |
| 2004/0145708 | A1 | | 7/2004 | Tanner et al. |

\* cited by examiner

*Primary Examiner*—Que T Le
(74) *Attorney, Agent, or Firm*—Andrew C. Cheng (57) ABSTRACT

A projection device includes a light source emitting light beams, a display element displaying images according to video signals, an adjustable collimator arranged between the light source and the display element, and a condensing lens unit arranged between the adjustable collimator and the display element. The adjustable collimator collimates the light beams of the light source to parallel beams. The condensing lens projects the parallel beams to the display element. A driving unit is used for adjusting a distance between the light source and the adjustable collimator. A lens adjusting unit is used for adjusting a focus of the adjustable collimator according to the distance between the light source and the adjustable collimator. The projection device can reduce light loss and achieve a projection image with high contrast and high brightness.

14 Claims, 8 Drawing Sheets

PROJECTION DEVICE HAVING A LENS ADJUSTING UNIT ADJUSTING A FOCUS OF AN ADJUSTABLE COLLIMATOR ACCORDING TO THE DISTANCE BETWEEN A LIGHT SOURCE AND THE ADJUSTABLE COLLIMATOR

BACKGROUND

1. Technical Field

The present invention relates generally to a projection device, and more particularly to an adjusting method of an iris of the projection device.

2. Description of Related Art

Figure 5:
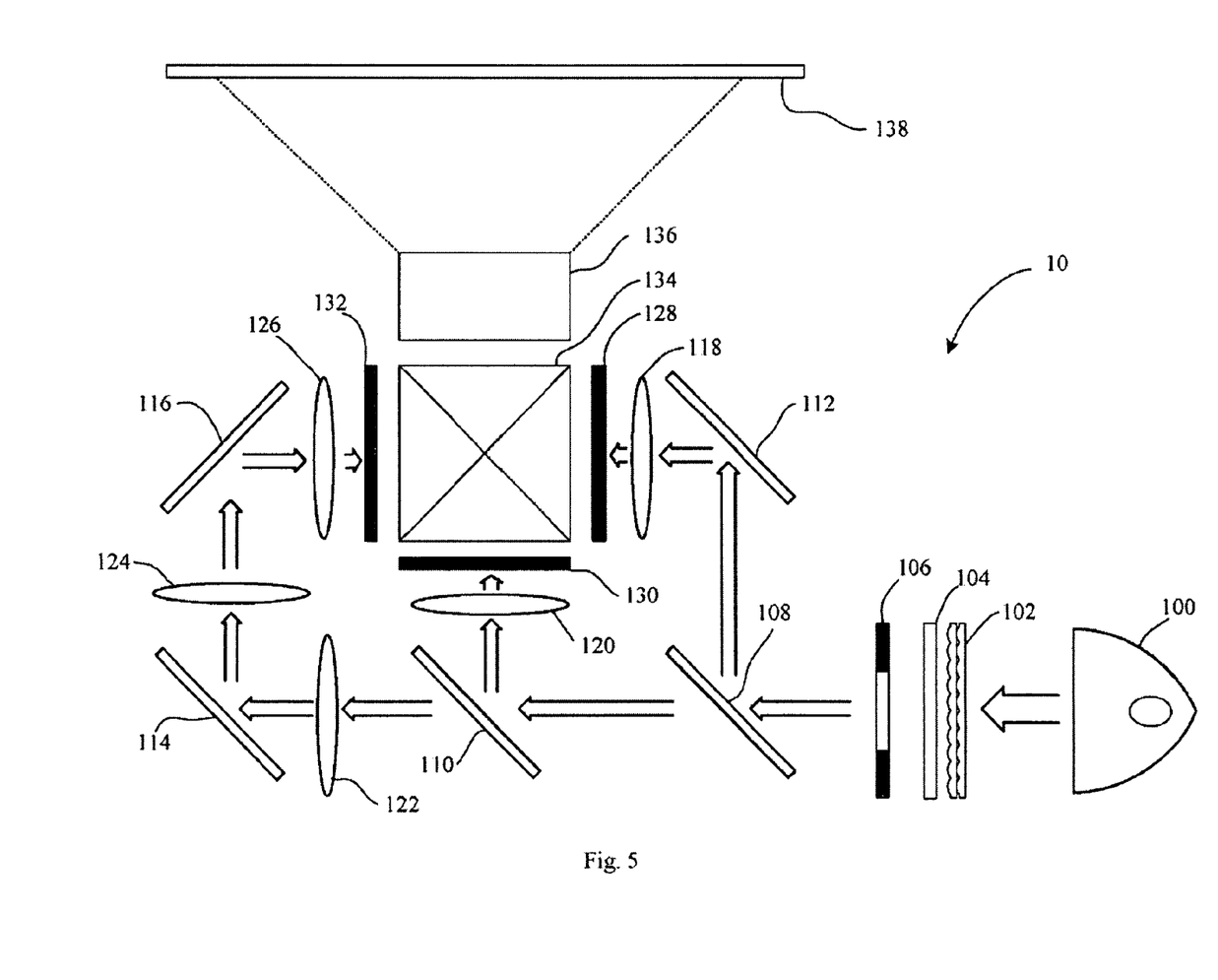
FIG. 5 is a schematic view of a conventional projector.

As shown in FIG. 5, a conventional projector 10 includes a light source 100, a parallel lens array 102, a P-S converter 104, an iris 106, a pair of spectroscopes 108, 110, three reflecting mirrors 112, 114, 116, five condensing lenses 118, 120, 122, 124, 126, three liquid crystal panels (LCDs) 128, 130, 132, a combination prism 134, and a projection lens 136. The light source 100 is used for emitting white light beams. The white light beams pass through the parallel lens array 102 to the P-S converter 104. The P-S converter 104 is used to convert P-polarized beam to S-polarized beam. Thus an extinction ratio of the light beams which equal to Rs/Rp increases. The light beam output from the P-S converter 104 is separated into color beams R, G and B of red, green and blue through the processing of the spectroscopes 108, 110. The color beams R, G and B are reflected at a right angle by the reflecting mirrors 112, 114, 116, respectively. The condensing lenses 118, 120, 122, 124, 126 are used for collimating the color beams R, G and B. Then the color beams R, G and B come into the LCDs 128, 130, 132, respectively, with image information corresponding to video signals. The combination prism 134 synthesizes the color beams R, G and B, and finally the projection lens 136 magnifies and projects the synthesized color beams onto a screen to display images.

Figure 6:
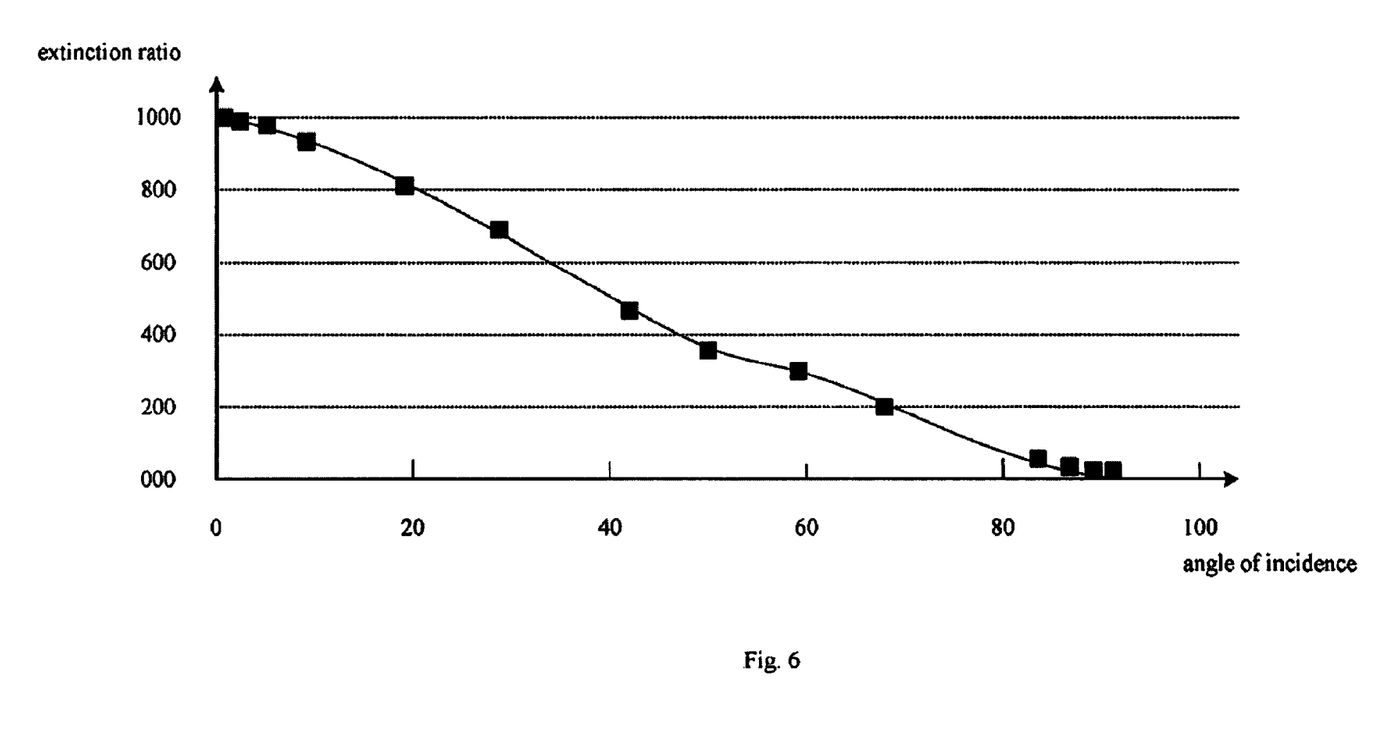
FIG. 6 is a graph indicating a relationship of an extinction ratio and an angle of incidence of light of a liquid crystal panel.
Figure 7:
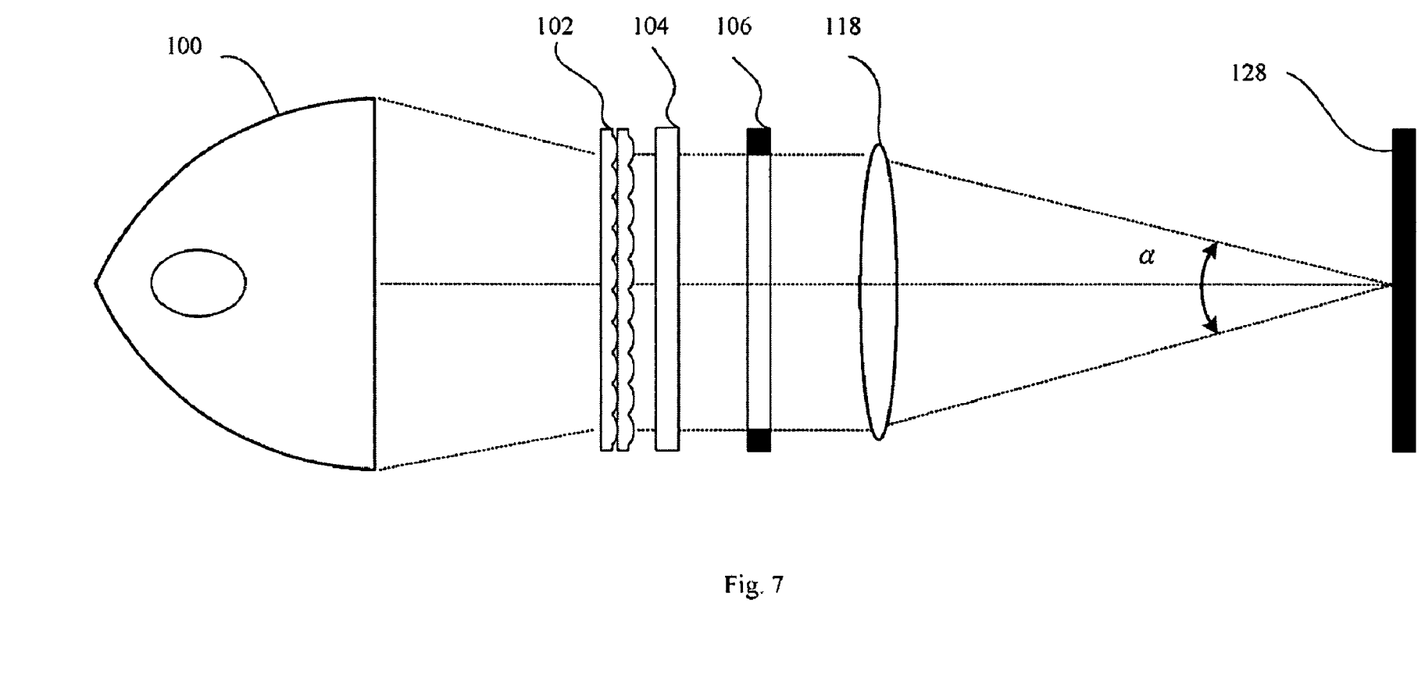
FIGS. 7 and 8 are optical pathway diagrams of the projector of FIG. 5 with an iris at two settings respectively.
Figure 8:
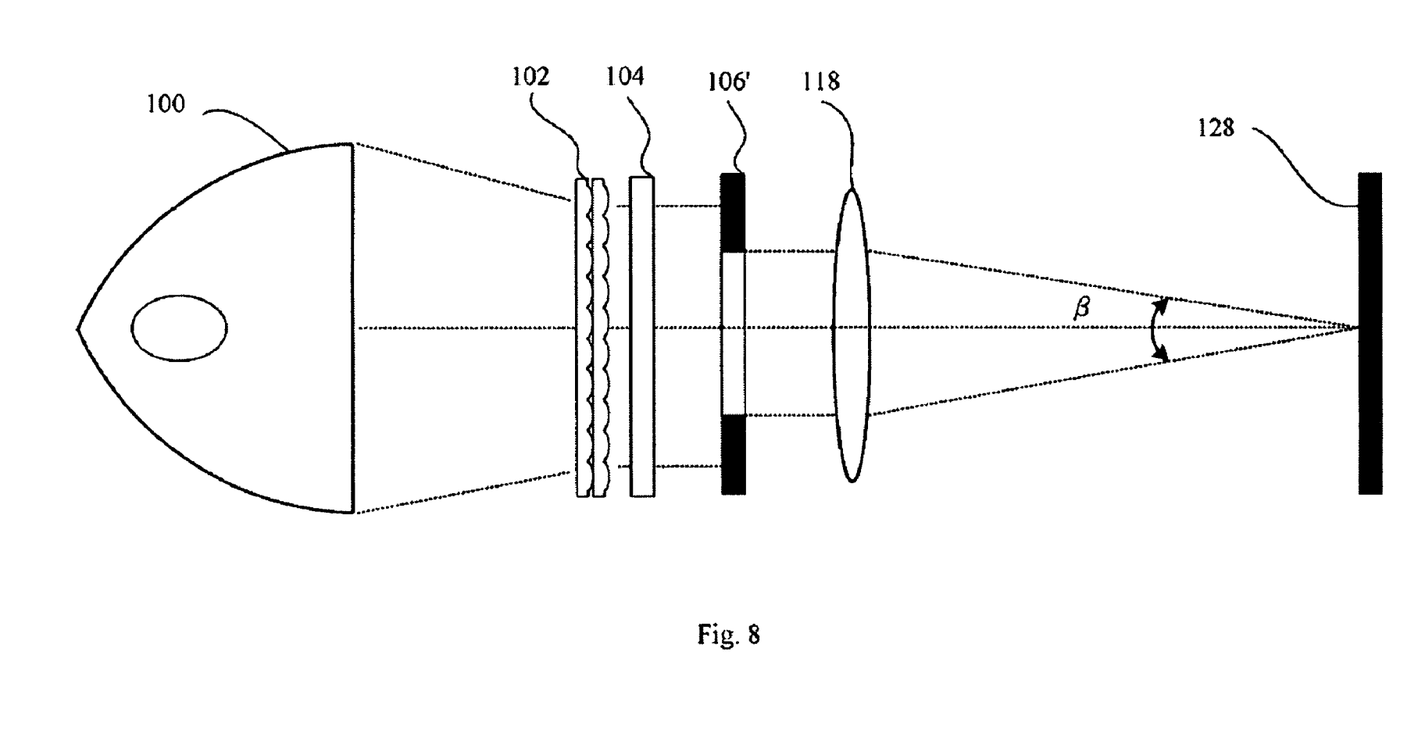

FIG. 6 is a graph indicating a relationship of an extinction ratio and an angle of incidence of light of an LCD. As the angle of incidence of light increases, the extinction ratio decreases. FIGS. 7-8 show two different situations of the projector. The difference between the two situations is that the iris 106 of FIG. 7 is more open than the iris 106' of FIG. 8. Thus only part of the beams can move through the iris 106' of FIG. 8. Part of the light is wasted, and a luminous energy of the light decreases. Thus, the brightness of images of the projector of FIG. 8 decreases. Because the iris 106 of FIG. 7 is more open than the iris 106' of FIG. 8, an angle α of incidence of light of FIG. 7 is larger than the angle β of incidence of light of FIG. 8, and the contrast of images of the projector of FIG. 7 is less than that of FIG. 8. Thus the conventional projector cannot achieve a projection image with high contrast and high brightness at the same time.

Therefore, a new projection device is desired to overcome the above describe shortcomings.

SUMMARY

In accordance with an embodiment, a projection device includes a light source used for emitting light beams, a display element used for displaying images according to video signals, an adjustable collimator arranged between the light source and the display element, a condensing lens unit arranged between the adjustable collimator and the display element. The adjustable collimator collimates the light beams of the light source to parallel beams. The condensing lens projects the parallel beams to the display element. A driving unit is used for adjusting a distance between the light source and the adjustable collimator. A lens adjusting unit is used for adjusting focus of the adjustable collimator according to the adjusted distance between the light source and the adjustable collimator. The projection device can reduce light loss and achieve a projection image with high contrast and high brightness.

Other advantages and novel features of the present invention will be drawn from the following detailed description of a preferred embodiment of the present invention with attached drawings.

DETAILED DESCRIPTION OF THE EMBODIMENTS

The detailed explanation of a projection device according to the present invention will now be made with reference to the drawings attached hereto. The projection machine can be a projector or a projection television. In this embodiment, the projection machine is a projector 20.

Figure 1:
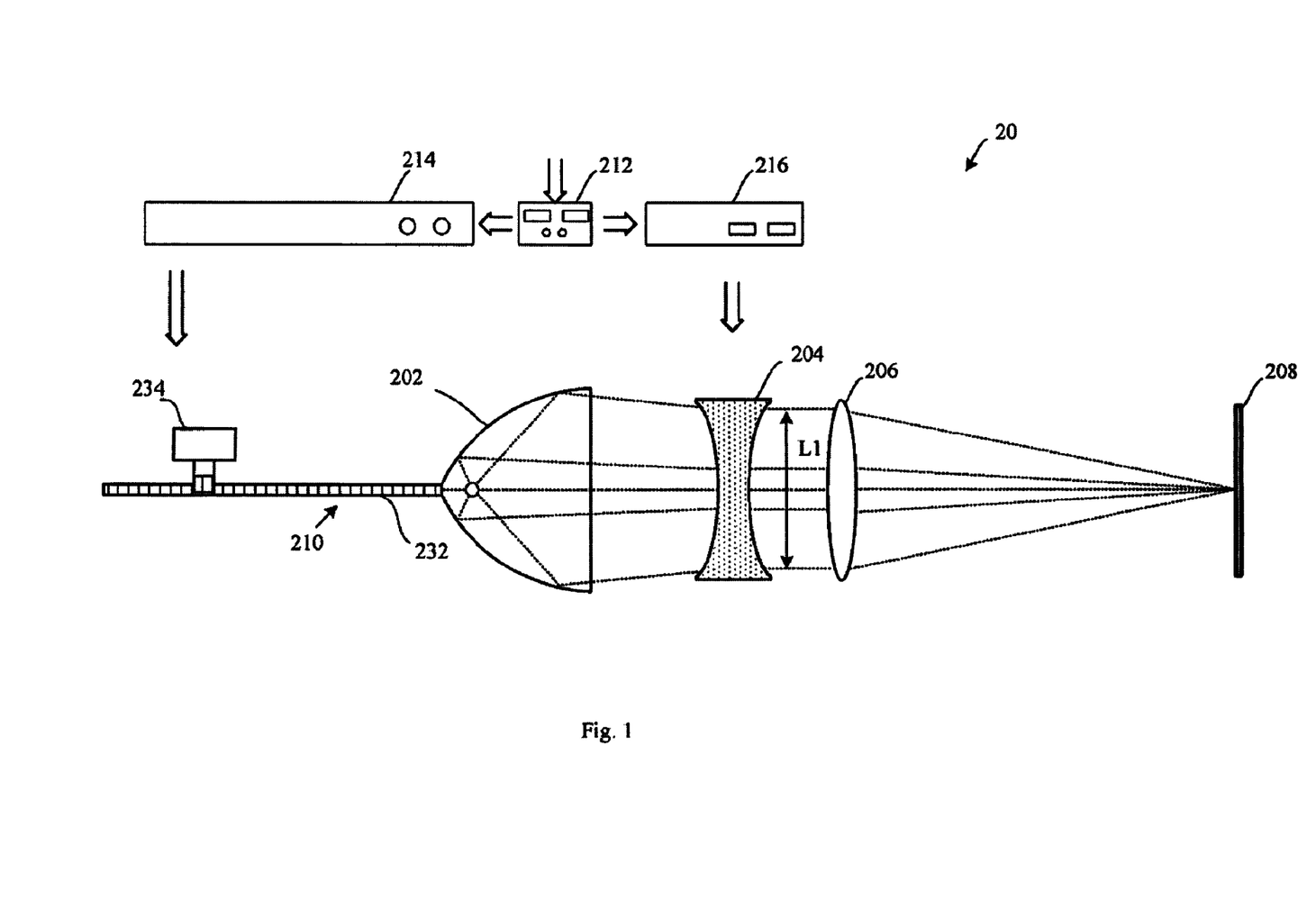
FIG. 1 is a schematic view of a projection device including a light source according to a first exemplary embodiment.

Referring to FIG. 1, the projector 20 includes a light source 202, an adjustable collimator 204, a condensing lens unit 206, a display element 208, a driving unit 210, a driving control unit 214, a receiving unit 212, and a lens adjusting unit 216. The light source 202 is used for emitting light beams. The light beams output from the light source 202 are converted to parallel beams through the adjustable collimator 204. The parallel beams are then projected to the display element 208 through the condensing lens unit 206. In this embodiment, the display element 208 is a liquid crystal panel (LCD). The adjustable collimator 204 is used to convert beams emitted by the light source 202 to parallel beams. The adjustable collimator 204 can be a liquid lens or an adjustable lens unit.

Figure 4:
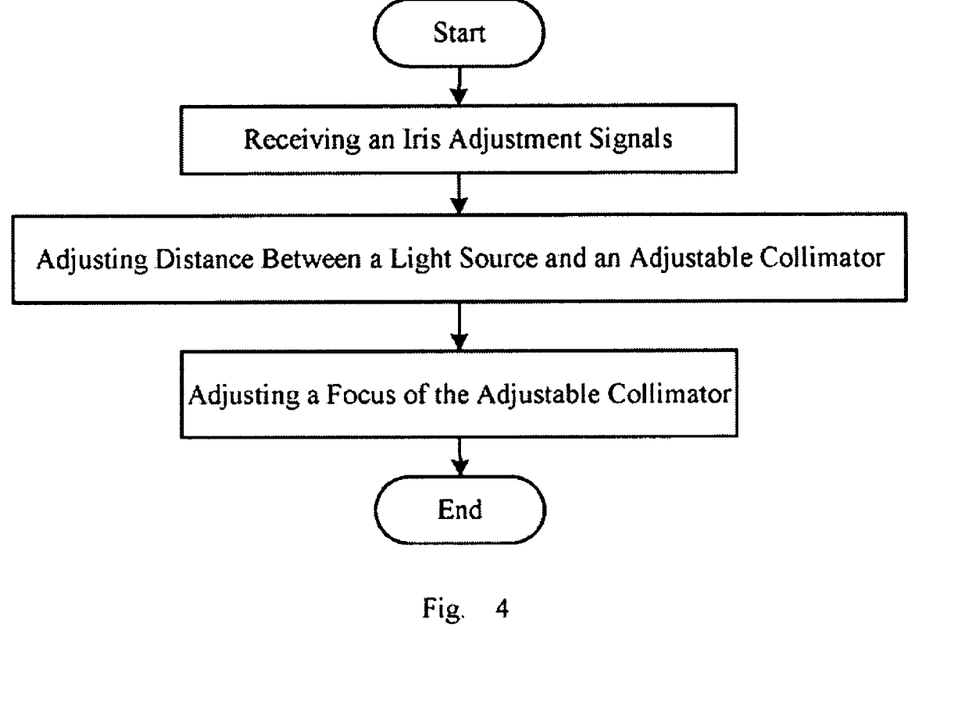
FIG. 4 is a flow chart showing an exemplary embodiment of a method of adjusting an iris of the projection device.

Referring to FIGS. 1 and 4, a method for adjusting an iris is shown. Firstly, a receiving unit 212 is used to receive an iris adjustment signal. The iris adjustment signal is usually generated by the projector 20 according to the different kinds of video signals that need to be shown. Alternatively, the iris adjustment signal can be manually generated. The receiving unit 212 is connected to the driving control unit 214. The driving control unit 214 is connected to the driving unit 210. When the receiving unit 212 receives the iris adjustment signal, the driving control unit 214 activates the driving unit 210 with a control signal. The driving unit 210 includes a motor 234 and a transmission shaft 232 connected to the motor 234. The transmission shaft 232 is arranged parallel to an optical axis of the adjustable collimator 204. The light source 202 connects to the transmission shaft 232. To adjust the iris, the driving control unit 214 controls the motor 234 of the driving unit 210 to move the transmission shaft 232 linearly along the optical axis, and so moving the light source 202 along the optical axis. A distance between the light source 202 and the adjustable collimator 204 is thus changed according to the iris adjustment signal. Alternatively, the distance between the light source 202 and the adjustable collimator 204 can be manually adjusted.

Figure 2:
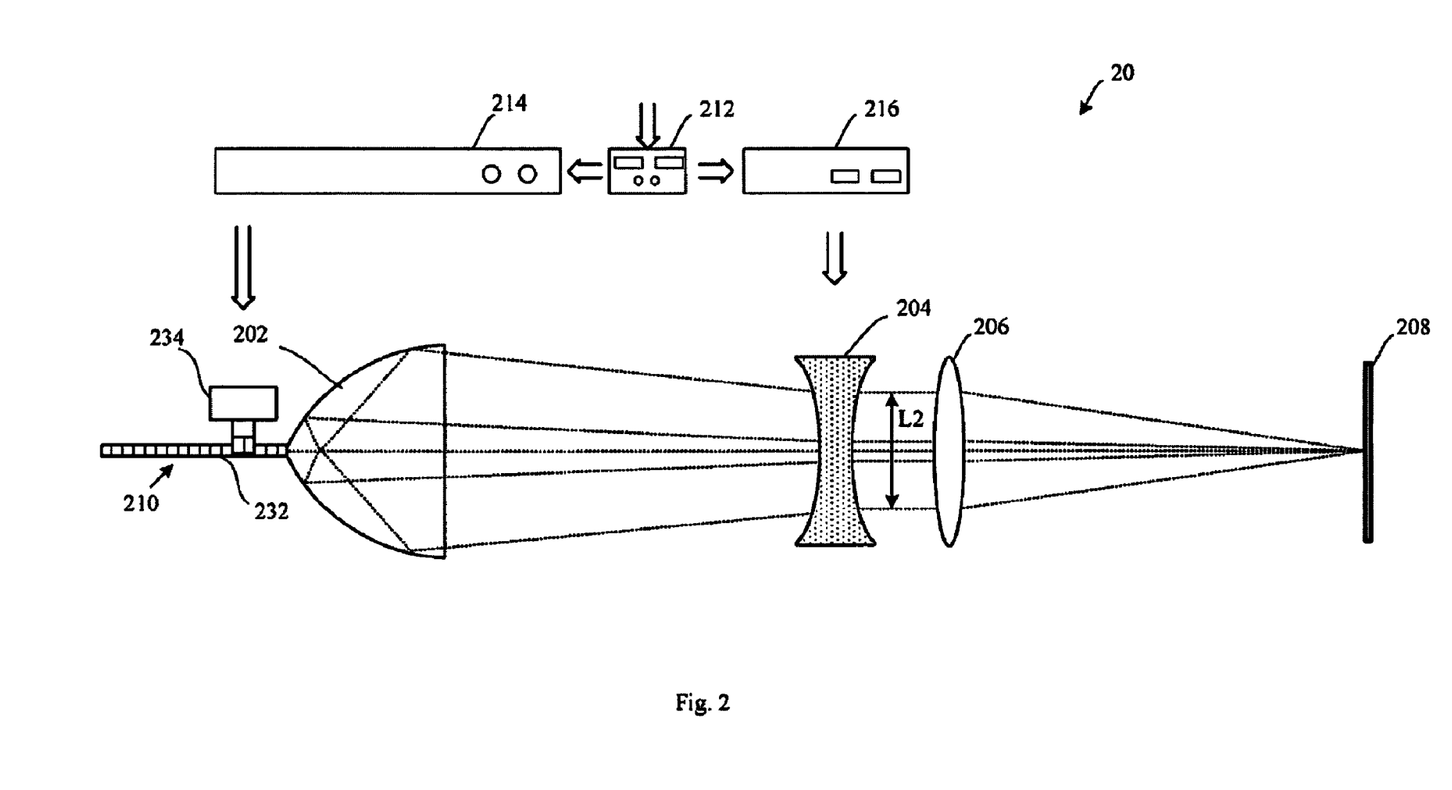
FIG. 2 is similar to FIG. 1, but shows the light source in a different position.

FIG. 2 shows the light source 202 positioned farther away from the adjustable collimator 204 compared with its position in FIG. 1. As the distance between the light source 202 and the adjustable collimator 204 changes, the focus of the adjustable collimator 204 changes. The lens adjusting unit 216 is used to change position of the adjustable collimator 204 to achieve parallel beams after the light beams of the light source 202 pass therethrough. Because the adjustable collimator 204 is a liquid lens, an electric field can be applied to the adjustable collimator 204 to change the focus thereof. When an adjustable lens unit is adopted as an adjustable collimator 204, the focus of the adjustable collimator 204 can be adjusted by changing the distance between the lenses of the adjustable lens unit. Finally the parallel beams are projected to the display element 208 through the condensing lens unit 206.

As the distance between the light source 202 and the adjustable collimator 204 increases, a lighting area of the adjustable collimator 204 decreases, and the parallel beams are closer together, thus, energy density of the parallel beams is relatively higher, and the angle of incidence of the light beams output from the adjustable collimator 204 decreases. According to the relationship between the extinction ratio and the angle of incidence of light, the extinction ratio increases as the light source 202 moves away from the adjustable collimator 204. Thus the projector 20 can get a projection image with high contrast and high brightness at the same time. Table 1 below shows the contrast and brightness of the projectors 20 with different iris settings. Nos. 1, 3 and 5 show contrast and brightness of conventional projectors, while Nos. 2, 4 and 6 show contrast and brightness of the present projector 20. For example, No. 3 and No. 4 of table 1 respectively show the conventional projector and the present projector 20 having the same iris set at F/6.64, the extinction ratio (contrast) equal to Rs/Rp of the present invention, is about 48, which is much larger than that of the conventional projector which is about 37.6. Additionally, the sum of Rs and Rp, (brightness of the present projector 20), is about 3035.5, which is much larger than that of the conventional projector.

TABLE 1

| NO. | IRIS | Rs | Rs/Rp | Rs + Rp |
|---|---|---|---|---|
| 1 | F/3.80 | 4594.1 | 28.6 | 4754.7 |
| 2 |  | 4594.1 | 28.6 | 4754.7 |
| 3 | F/6.64 | 2558.7 | 37.6 | 2626.8 |
| 4 |  | 2793.6 | 48.0 | 3035.5 |
| 5 | F/8.41 | 1653.5 | 44.6 | 1690.6 |
| 6 |  | 2086.6 | 56.7 | 2123.4 |

Figure 3:
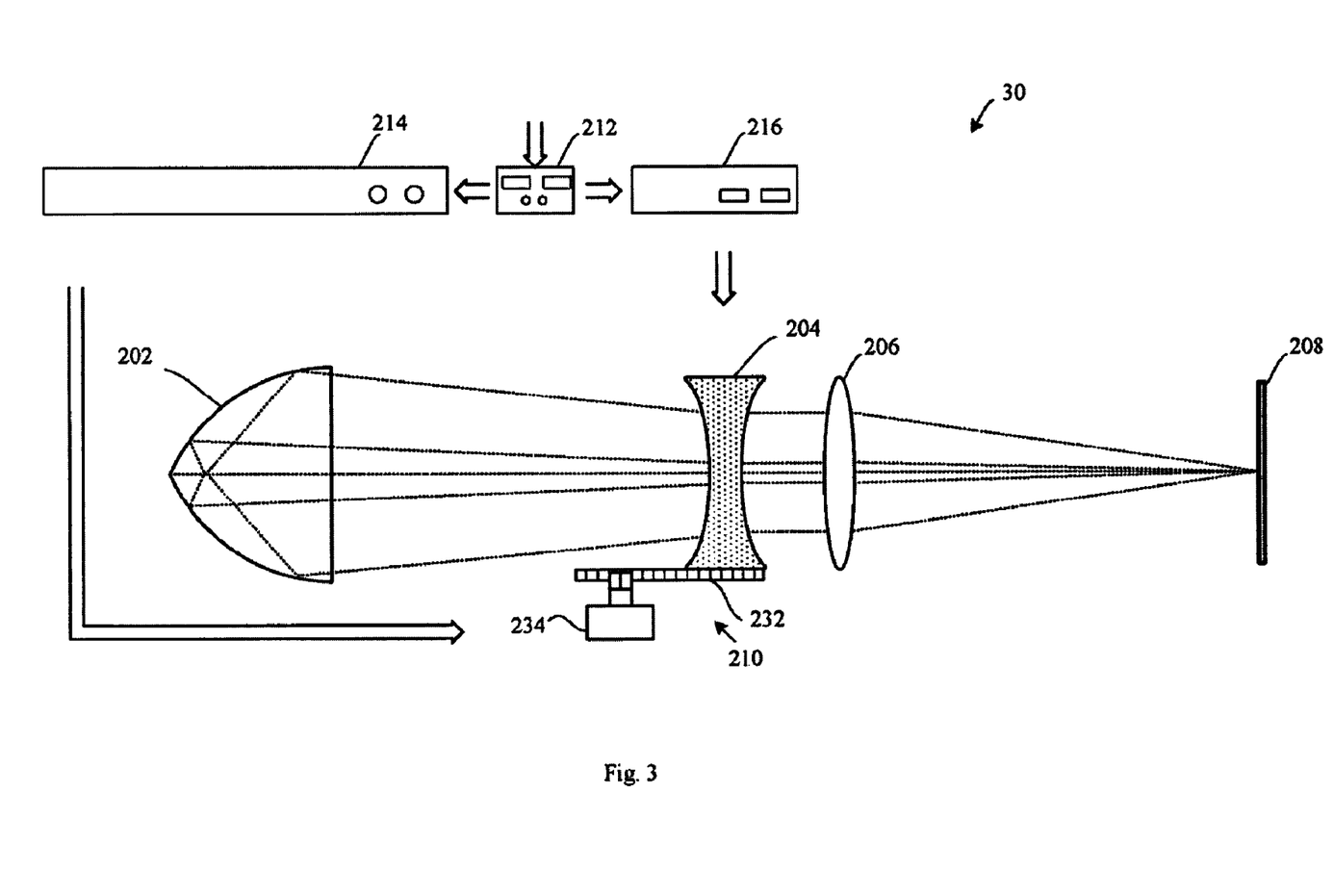
FIG. 3 shows the projection device according to a second exemplary embodiment.

FIG. 3 shows a second exemplary embodiment of the projector 30. The difference between the second embodiment and the first embodiment is that the transmission shaft 232 of the driving unit 210 is connected to the adjustable collimator 204. Thus the motor 234 drives the adjustable collimator 204 moving along the optical axis to change the distance between the light source 202 and the adjustable collimator 204.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A projection device, comprising:
    a display element configured for displaying images according to video signals;
    a light source used for emitting light beams;
    an adjustable collimator arranged between the light source and the display element, the adjustable collimator collimating the light beams of the light source to parallel beams;
    a condensing lens unit arranged between the adjustable collimator and the display element for projecting the parallel beams to the display element;
    a driving unit configured for adjusting a distance between the light source and the adjustable collimator; and
    a lens adjusting unit adjusting a focus of the adjustable collimator according to the distance between the light source and the adjustable collimator.

2. The projection device of claim 1, further comprising a receiving unit used for receiving an iris adjustment signal, and a driving control unit used for controlling movement of the driving unit according to the iris adjustment signal.

3. The projection device of claim 1, wherein the adjustable collimator is a liquid lens or an adjustable lens unit.

4. The projection device of claim 1, wherein the driving unit drives the light source into movement to adjust the distance between the light source and the adjustable collimator.

5. The projection device of claim 1, wherein the driving unit drives the adjustable collimator into movement to adjust the distance between the light source and the adjustable collimator.

6. The projection device of claim 1, wherein the driving unit comprises a motor and a transmission shaft connected with the motor, one of the light source and the adjustable collimator being connected to the transmission shaft and moving with the transmission shaft as the motor driving the transmission shaft into movement.

7. A lighting device of a projection device, comprising:
    a light source used for generating light beams;
    an adjustable collimator collimating the light beams of the light source to parallel beams;
    a driving unit adjusting a distance between the light source and the adjustable collimator; and
    a lens adjusting unit adjusting a focus of the adjustable collimator according to the distance between the light source and the adjustable collimator.

8. The lighting device of claim 7, wherein the driving unit comprises a motor and a transmission shaft connected with the motor, one of the light source and the adjustable collimator being connected to the transmission shaft and moving with the transmission shaft as the motor driving the transmission shaft into movement.

9. The lighting device of claim 8, wherein the adjustable collimator is connected to the transmission shaft and the driving unit drives the adjustable collimator into movement to adjust the distance between the light source and the adjustable collimator.

10. The lighting device of claim 8, wherein the light source is connected to the transmission shaft and the driving unit drives the light source into movement to adjust the distance between the light source and the adjustable collimator.

11. The projection device of claim 7, wherein the adjustable collimator is a liquid lens, and an electric field is applied to the adjustable collimator to change the focus thereof.

12. The projection device of claim 7, wherein the adjustable collimator is an adjustable lens unit, and the focus of the adjustable collimator is adjusted by changing the distance between the lenses of the adjustable lens unit.

13. A method of adjusting an iris of a projection device comprising the following steps:
 receiving an iris adjustment signals;
 adjusting a distance between a light source and an adjustable collimator; and
 adjusting a focus of the adjustable collimator according to the distance between the light source and the adjustable collimator.

14. The method of claim 13, wherein the adjustable collimator is a liquid lens or an adjustable lens unit.

* * * * *